UNITED STATES PATENT OFFICE 2,266,549

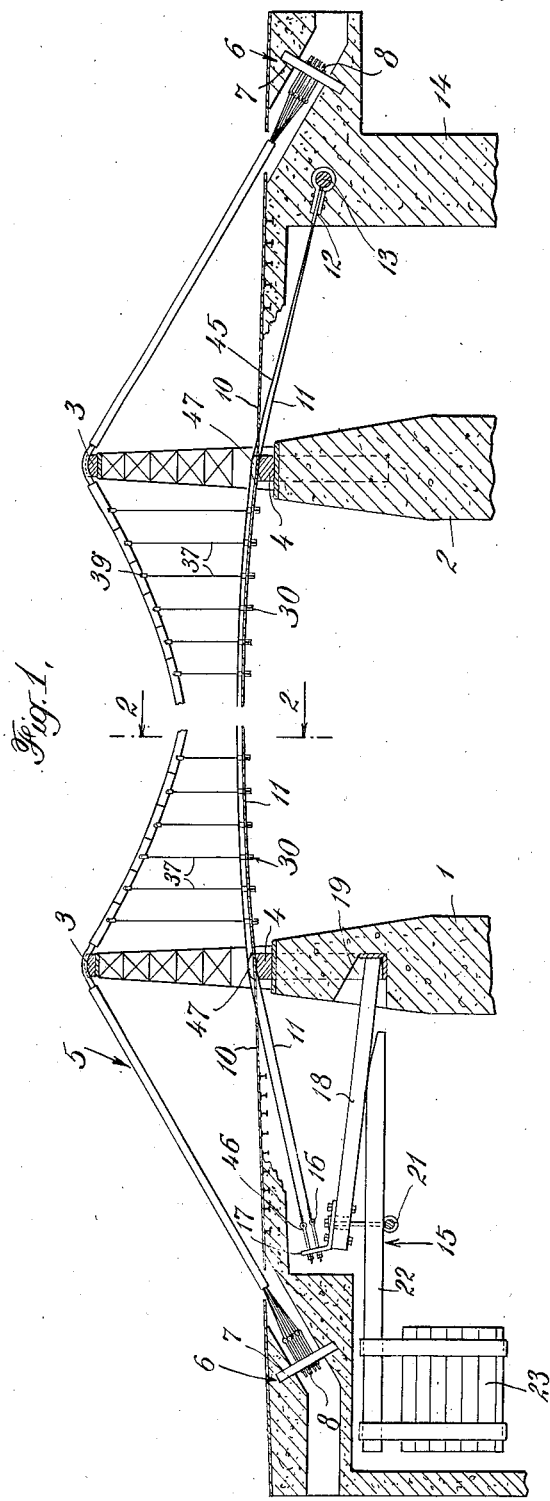

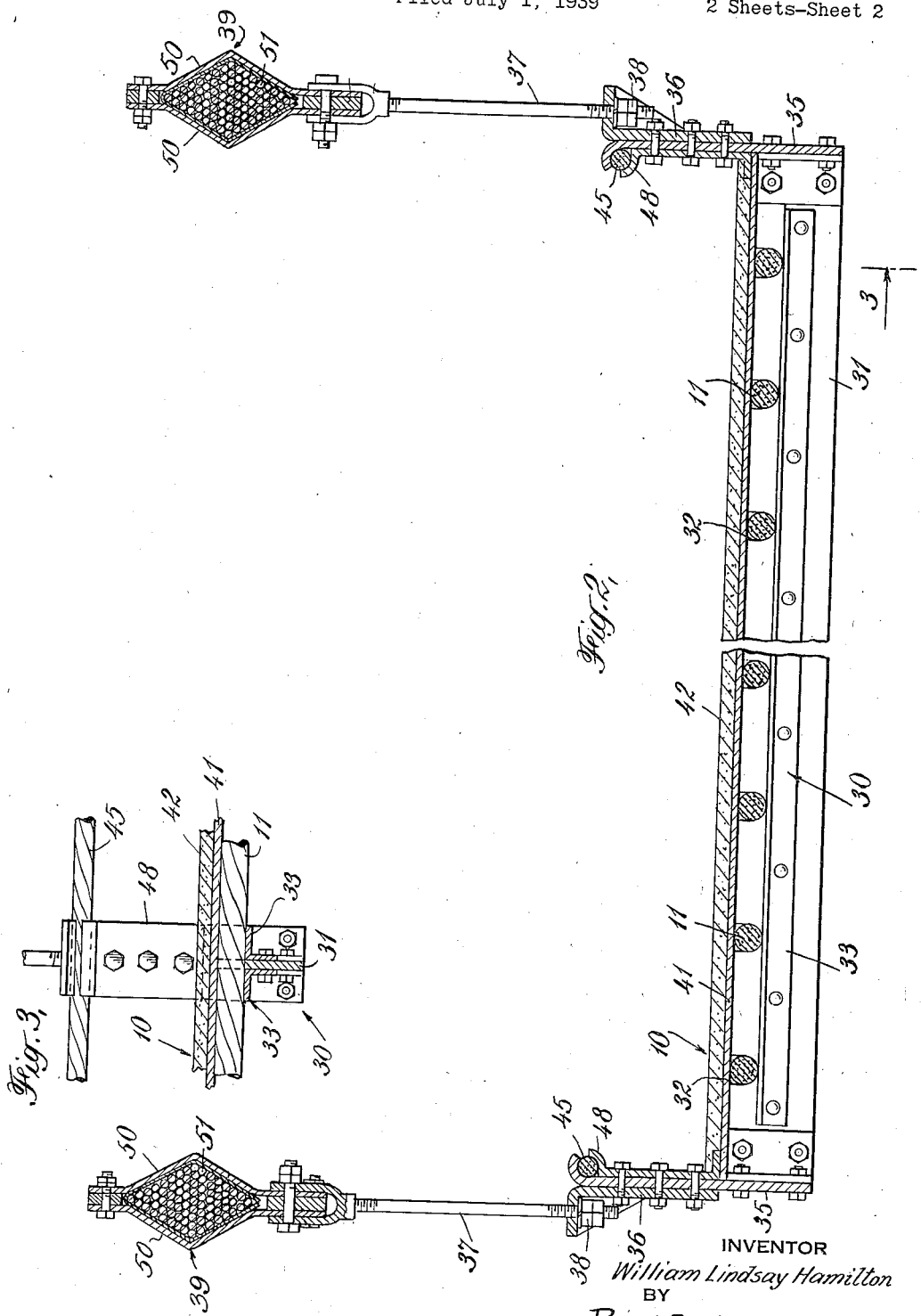

SUSPENSION BRIDGE

William Lindsay Hamilton, Glasgow, Scotland, assignor to Robert Forgan, Rye, N. Y.

Application July 1, 1939, Serial No. 282,512

7 Claims. (Cl. 14—18)

This invention relates to suspension bridges and has for its object the provision of certain improvements in bridges of this character. The invention aims to provide a suspension bridge having a floating road-bed suspended from catenaries. The road-bed is mounted upon or attached to a plurality of members extending across the span which are under a yieldable or variable tension and which are operatively connected to the catenaries enabling the members bearing the load to adjust themselves to varying conditions of strain.

The suspension bridge of the invention comprises two or more catenaries spanning two bridge supports, catenary towers, of the like (hereinafter called towers) and a floating road-bed suspended from the catenaries by a number of spaced supporting members such as rods, cables, or the like (hereinafter called tie-rods). The road-bed is mounted over, upon or attached to a plurality of members in tension extending across the span which are fixed near one end of the span and yieldingly connected near the other end of the span, thus enabling the road-bed to enjoy a floating movement under varying conditions of load, temperature, and wind. The members in tension under or attached to the road-bed should be capable of being curved without injury, and I prefer to use any suitable flexible member, such as a cable or group of cables (hereinafter called road-bed cables). It is, of course, understood that rods, beams, or even chains may be used with somewhat similar effect. I prefer to attach the road-bed cables at one end of the span in any suitable manner to a fixed anchorage usually placed beyond one of the towers, and to connect the road-bed cables at the other end of the span to a yieldable anchorage, for example directly or indirectly to a floating weight, which is capable of exerting great tension upon the road-bed cables.

In its more complete aspects, the bridge of the invention comprises two anchorages for the road-bed cables, one yieldable, located preferably at one side of one tower and the other fixed, located at one side of the other tower, and an intermediate saddle extending across each tower and located near the road-bed level. The road-bed cables extend from one of the anchorages over the intermediate saddles of the two towers to the other anchorage. The road-bed cables are arranged in parallel rows, one mounted alongside of the other, preferably under and parallel to the road-bed. The yieldable anchorage is preferably connected through a lever system to a weight of sufficient mass to draw the road-bed cables to the desired tension. At spaced intervals along the span of the bridge, a number of cross-beams are arranged under the road-bed cables, each cross-beam having a number of open-top channels, each channel for receiving one of the cables. The tie-rods, preferably arranged in an upright position, connect the end portions of the cross-beams to the catenaries. The cross-beams tend to secure the road-bed cables in their proper spaced positions and to distribute the load on each road-bed cable uniformly.

In a preferred bridge construction embodying the invention, the various members supporting the span of the bridge including the catenaries, the road-bed cables and the tie-rods are so constructed and arranged that the road-bed cables assume a permanent camber. By reason of the great tension existing in the road-bed cables and the cambered form thereof, the tie-rods connecting the catenaries to the end portions of the cross-beams are under tension by reason of their opposition to the component force tending to draw the road-bed cables into a straight line. The road-bed comprises any suitable flat structure such as solid metal plates, or an open structure such as a grating or grill mounted directly over the road-bed cables and cross-beams, and reinforced concrete slabs or the like may be placed over the plates or open structure.

I may provide side rails for the span of great strength and elasticity, and to this end I prefer to employ one or more cables at each side of the bridge at a convenient distance above the road-bed to serve as a buttress or guard for misdirected vehicles. The side-rail cables may supplement the action of the road-bed cables. Each side-rail cable is arranged at one side of the bridge and passes over a special intermediate saddle located the same distance above the intermediate saddle that the side-rail cable is above the level of the road-bed cables. One end of each side-rail cable is attached to the yieldable anchorage and the other end to the fixed anchorage. This enables the side-rail cables to enjoy the same floating movement as the road-bed cables.

In the accompanying drawings:

Fig. 1 is a diagrammatic side elevation of a suspension bridge embodying the invention;

Fig. 2 is a sectional view on an enlarged scale along the line 2—2 of Fig. 1; and Fig. 3 is a sectional view along the line 3—3 of Fig. 2.

The suspension bridge illustrated in the drawings comprises towers 1 and 2, each having at the upper end portion a catenary saddle 3 and at a lower point an intermediate saddle 4. A catenary cable 5 is supported upon the saddles 3 and the ends of the catenary are fixed in permanent anchorages 6. As illustrated, the catenary cables are formed of a number of individual cables 5I so arranged that the catenary cable has a cross-section in the shape of a diamond. These anchorages are located beyond or to one side of each of the towers. That part of the bridge between the towers defines what is known as the span of the bridge. Any suitable cable or equivalent element may be used for the catenary and while it is usual to employ two catenaries it is understood that the bridge of the invention applies to any number of catenaries such as 4, 6, or 8.

Each catenary anchorage preferably comprises a steel plate 7 embedded in or otherwise secured to a mass of concrete or other rigid structure, enabling it to withstand the strain imposed upon the catenary, and the plate is provided with a number of spaced holes in which bolts 8 are inserted and adjusted by nuts. Individual portions of the catenary cable are attached to each bolt and the spacing between the holes enables the individual portions to be fanned out providing space for cable couplings, attachments to the bolts, etc. By means of the bolts and nuts, the separate parts of the cable attached to the plate may receive individual tension adjustments.

The intermediate saddles 4 extend across the towers and are located on the approximate level of the road-bed 10 where it crosses the towers. A number of road-bed cables 11 extend between the towers and rest upon the saddles 4. These road-bed cables are arranged one alongside the other in parallel rows, for example, at intervals of 2, 4, or 6 feet across the width of the road-bed depending upon the size of the cables and the characteristics of the bridge. One end of each road-bed cable is attached securely but adjustably by any suitable means as by the bolts and shackles 12 to a hook, eyelet, loop, rod, or the like 13 secured in the fixed anchorage 14 which is located off to one side of the tower 2. The fixed anchorage 14 and the catenary anchorage 6 may or may not be combined into a common anchorage as shown in the drawings. They may be arranged as entirely separate anchorages and spaced considerable distances apart, and the fixed anchorage may even be combined with the foundation of tower 2, depending upon the peculiarities of each particular bridge. The other end of each road-bed cable 11 is attached to a yieldable anchorage 15, the immediate attachment being effected by a bolt 16 at the end of each cable which passes through a hole in an anchorage plate 17 attached to one extremity of a beam 18. The other end of the beam 18 is mounted in a recess 19 formed in the tower 1, preferably in the masonry part of the foundation. While the beam 18 may have slight pivotal motion in the recess, it also has the important function of receiving the thrust imposed thereon by the tension of the road-bed cables 11. Near one end of the beam 18 a stirrup 21 is attached and the suspended portion is pivotally connected to a second lever 22, one end of which has a large weight 23 attached thereto and the upper portion at the other end is beveled and placed under an intermediate part of the beam 18. The tension in the road-bed cables tends to turn the beam 18 clockwise with the recess 19 as a pivotal point. This action is counteracted by the force of the weight 23 acting upon the stirrup 21 tending to turn the beam 18 counterclockwise. The downward movement of the beam 18 extends the road-bed cables placing them under a relatively great tension. While I may use other lever and weight arrangements, I prefer the arrangement illustrated because I may conveniently place the entire yieldable anchorage under the road-bed. It is understood that other arrangements may be employed to apply a variable tension to the road-bed cables without departing from the scope or intent of the invention.

At spaced intervals along the span, a number of cross-beams 30 are arranged one parallel to the other and these may advantageously be arranged about 6 feet apart in the usual bridge. The cross-beams are best shown in Figs. 2 and 3 and comprise an upright plate 31 in which are formed, at uniform distances throughout its length, open-top channels 32. At the lowermost portion of each of the channels, two angle bars 33 are attached as by bolts to the plate 31 to add stiffness to the cross-beam, and one of the road-bed cables is arranged to be mounted in each open-top channel and to rest partly upon the angle bars and the bottom of the open-top channel in the plate 31.

At the end portion of each cross-beam 30, an upwardly extending end plate 35 is attached, to which is bolted or otherwise secured a bracket 36 having an opening to receive the threaded end of a tie-rod 37 which is adjustably secured in the opening by lock nuts 38. The tie-rods may be securely attached to the catenary cable by any convenient means such as are now employed in catenary bridges, or by the clamps 39 constructed for attachment to a catenary of diamond cross-section. As shown in the drawings, the clamps have side plates 50 bolted together which are of such length that the plates of adjacent clamps butt against each other.

The road-bed 10 of the bridge is preferably mounted directly over the road-bed cables 11 and also in engagement with the upper bearing surfaces of the cross-beams. While the road-bed may bear directly on both the road-bed cables and the cross-beams in the preferred construction, it is practicably feasible to have the road-bed rest on only one of these members depending upon the spacing of the members, etc. The road-bed may advantageously be formed of an open metal structure such as a grating or grill, or of relatively large steel plates 41 which are placed upon the road-bed cables and any suitable surfacing material such as reinforced concrete 42 or the like may be applied thereover. In the construction just described, the road-bed is accordingly mounted directly upon and is parallel to the road-bed cables.

In its more complete or preferred form, the suspension bridge of the invention includes a side-rail cable 45 at each side thereof located a sufficient distance above the road-bed to act as a barrier for misdirected vehicles. This provides a parapet of great strength and resiliency. Each side-rail cable is attached at one end to a fixed anchorage, advantageously to the rod 13 of the anchorage 14, and at the other end to any yieldable means, for example, by means of adjustment bolts 46 to the plate 17 of the yieldable anchorage 15. In order that the side-rail cables 45 may supplement the tension force of the road-bed cables and be adjustable with respect thereto under the varying conditions of strain imposed upon the bridge span, they are each mounted upon a special intermediate saddle 47 on each of the towers. These saddles 47 are spaced the same distance above the intermediate saddles 4 that each side-rail cable is above the road-bed cables. The upper portions of the end plates 35 are preferably curved inwardly to receive the side-rail cables which are secured therein by plates 48 bolted thereto.

The catenary cables, tie-rods, and road-bed cables are so constructed and arranged that, with the normal tension existing in the road-bed cables, the road-bed cables and the road-bed which they support are given a permanent camber. Since there is considerable tension in the tie-rods as a result of the tendency of the cambered road-bed cables to assume a straight line, any force, such as a lateral wind across the span of the bridge, will not cause the bridge to sway in the manner characteristic of suspension bridges constructed heretofore. The tension of the road-bed cables immediately opposes any tendency to move the span laterally. Any force tending to move the span of the bridge from one side to the other must tend to straighten out the catenary cables but this is immediately opposed by the tension forces in the tie-rods because this action would tend also to increase the camber of the road-bed cables and this is yieldingly opposed by increasing forces in the yieldable anchorage.

I claim:

1. A suspension bridge which comprises two towers, at least two catenaries on the towers, means for anchoring the ends of the catenaries, a plurality of cambered road-bed cables extending between and across the towers, a fixed anchorage to which the road-bed cables are attached at one end, a yieldable anchorage to which the road-bed cables are attached at the other end, said yieldable anchorage being arranged to apply a great tension to the road-bed cables, a road-bed operatively attached to the road-bed cables, and means at spaced intervals connecting the catenaries to the road-bed cables and holding the road-bed cables in their cambered position.

2. A suspension bridge which comprises a plurality of catenaries, a road-bed, a plurality of cambered road-bed cables under the road-bed, said road-bed cables being attached to a fixed anchorage at one end and to a yieldable anchorage at the other end, tie-rods operatively connecting the catenaries to the road-bed cables, said catenaries and tie-rods holding the road-bed cables in the cambered position, the road-bed cables being in tension and having force components on the tie-rods acting downwardly, a cambered side-rail cable at each side of the bridge and above the road-bed, each side rail cable being attached to the fixed anchorage at one end and attached to the yieldable anchorage at the other end and connected by the tie-rods to a catenary which hold the side-rail cable in its cambered position.

3. A suspension bridge which comprises two towers, at least two catenaries carried by the towers, means at the side of each tower for anchoring the catenaries, an intermediate saddle for each tower, a plurality of road-bed cables arranged in parallel rows extending across the span of the bridge and supported by the intermediate saddles, anchorage means near one of the towers to which one end of each road-bed cable is attached, a yieldable anchorage near the other tower to which the other end of each road-bed cable is attached, said yieldable anchorage including a weight acting through a lever system whereby the tension force in the road-bed cable is greater than the force of gravity acting on the weight, a number of cross-beams arranged at spaced intervals under the road-bed cables, a tie-rod operatively connecting the end portion of each cross-beam to one of the catenaries, said catenaries, road-bed cables, tie-rods and yieldable anchorage being constructed and arranged to draw the road-bed cables into a camber, and a road-bed supported by the cross-beams.

4. In a bridge having the road-bed of a span supported through tie-rods by catenaries, the improvement which comprises at least two cables, one extending along each side-portion of the bridge and across the span, each cable being connected through tie-rods to one of the catenaries, each cable being yieldingly anchored and under appreciable constant tension irrespective of changes in the length of the catenaries due to changes in temperature, each cable being at a higher elevation near the center of the span than at the sides of the span where the cables are anchored, whereby downward force components in the cables hold the road-bed down.

5. A suspension bridge which comprises at least two towers, at least two catenaries supported on and extending between the towers, a road-bed suspended from the catenaries, at least two road-bed cables in operative attachment to the road-bed, means connecting the road-bed cables to the catenaries holding the road-bed cables in a cambered position, means for securing the road-bed cables in yieldable engagement with an anchorage, said road-bed cables being under such tension as to pull the road-bed and catenaries in a downward direction, thereby preventing side-sway of the road-bed, and said yieldable means comprising a floating weight exerting continuous tension on said road-bed cables irrespective of variations in the length of the catenaries due to changes in temperature.

6. In a suspension bridge having a single catenary span supported between two rigid towers by at least two catenaries supported on and extending between the towers, a cambered road-bed supported by the catenaries, the catenaries at each side of the catenary span extending from a tower to an anchorage to which they are attached, the improvement which comprises at least two cables extending across the catenary span, each cable being connected to the road-bed, each cable being yieldingly anchored and under appreciable constant tension irrespective of the changes in the length of the catenaries due to changes in temperature, each cable being at a higher elevation near the center of the span than where the cables are anchored, whereby downward force components in the cables hold the road-bed down.

7. A suspension bridge which comprises two rigid towers, at least two catenaries supported on and extending between the towers forming a single catenary span, the catenaries at each side of the catenary span extending from a tower to an anchorage to which they are attached, a cambered road-bed suspended from the catenaries, at least one cable in operative attachment to the road-bed, means connecting the cable to the catenaries holding the cable in a cambered position, and means for securing the cable in yieldable engagement with an anchorage, said cable being under such tension as to pull the road-bed and catenaries in a downward direction, thereby suppressing side-sway of the road-bed and holding the road-bed down, said yieldable means comprising a floating weight exerting continuous tension on said cable irrespective of variations in the length of the catenaries due to changes in temperature.

WILLIAM LINDSAY HAMILTON.